(12) United States Patent
Sagar et al.

(10) Patent No.: US 8,620,889 B2
(45) Date of Patent: Dec. 31, 2013

(54) MANAGING DATA TRANSFER BETWEEN ENDPOINTS IN A DISTRIBUTED COMPUTING ENVIRONMENT

(75) Inventors: Akash Jeevan Sagar, Redmond, WA (US); Muthukaruppan Annamalai, Bellevue, WA (US); Vladimir D. Fedorov, Bellevue, WA (US); Richard Y. Chung, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 12/057,364

(22) Filed: Mar. 27, 2008

(65) Prior Publication Data

US 2009/0248693 A1    Oct. 1, 2009

(51) Int. Cl.
*G06F 7/00*         (2006.01)
(52) U.S. Cl.
USPC ........... 707/705; 707/770; 707/822; 709/201; 709/217
(58) Field of Classification Search
USPC ............. 707/999.01, 770, 999.001, 705, 822; 709/219, 202, 217
See application file for complete search history.

(56) References Cited

U.S. PATENT DOCUMENTS

| | | | |
|---|---|---|---|
| 7,143,087 B2* | 11/2006 | Fairweather | 707/770 |
| 2005/0147130 A1* | 7/2005 | Hurwitz et al. | 370/503 |
| 2005/0177624 A1* | 8/2005 | Oswald et al. | 709/219 |
| 2005/0182773 A1* | 8/2005 | Feinsmith | 707/100 |
| 2006/0129627 A1* | 6/2006 | Phillips et al. | 709/200 |
| 2006/0184652 A1* | 8/2006 | Teodosiu et al. | 709/221 |
| 2008/0160911 A1* | 7/2008 | Chou et al. | 455/7 |
| 2009/0055471 A1* | 2/2009 | Kozat et al. | 709/203 |

* cited by examiner

*Primary Examiner* — Shew-Fen Lin
*Assistant Examiner* — Jieying Tang
(74) *Attorney, Agent, or Firm* — Mayer & Williams, PC

(57) ABSTRACT

A file fetcher manager provides commonly-utilized management and resource allocation for multiple file fetchers that each implement a different type of mechanism or protocol for transferring data files between peer endpoints in meshes associated with a cloud-computing service. Each file fetcher is configured with both client-side and server-side components to retrieve and serve out data files. The file fetcher manager encapsulates the file fetchers to provide an abstract interface to callers while hiding the underlying details of the file fetchers. The file fetcher manager is arranged for managing simultaneous operations of the multiple file fetchers to route requests from the callers to the appropriate file fetchers, and for scheduling work items for the file fetchers so that data transfers efficiently utilize available resources while keeping the entire transfer process coherent and organized.

11 Claims, 9 Drawing Sheets

MANAGING DATA TRANSFER BETWEEN ENDPOINTS IN A DISTRIBUTED COMPUTING ENVIRONMENT

BACKGROUND

During approximately the last 30 years dramatic advances in technology—for example, the development of the mini-computer, the rise of the personal computer, and the emergence of the Internet—have revolutionized the way information is created, stored, shared, and used. Today, as technology continues to advance and improve, new breakthroughs are transforming the world once again. The foundation for the current transformation is the combination of an increasing diversity of ever more powerful devices, and the expanding data storage capacity in large scale networked data centers ("the cloud") that are accessed through the growing ubiquity of broadband networks that comprise the Internet. The capabilities of such technologies are supporting the movement of computing resources, including both consumer and business-oriented applications, from the desktop or enterprise environment out to the Internet as hosted services.

Under such a cloud-computing model, locally installed software on a client platform may be replaced, supplemented, or blended with a service component that is delivered over a network. Such models can often give customers more choices and flexibility by delivering software solutions and user experiences that can typically be rapidly deployed and accompanied by value-added services. In addition to providing application services, cloud-based computing can also typically provide data sharing and storage capabilities for users to access, collaborate in, and share rich data that leverages the global cloud-computing footprint. Here, files are typically transferred between endpoint devices on the cloud such as PCs (personal computers) and portable devices like mobile phones. Typically, one single file transfer protocol is utilized where all the endpoints sharing files must communicate using that particular protocol. For example, file sharing systems and services like BitTorrent and Napster might use a variety of different network structures, including client-server, pure peer-to-peer, hybrid peer-to-peer, and combinations thereof, but the endpoints need to utilize a globally consistent protocol to ensure proper communication.

While service platforms in the cloud are expected to provide attractive, feature-rich solutions to customers that are well managed, robust, and cost-effective, it is desirable to have effective and efficient ways to transfer data between client devices using the service. In particular, more flexible and extensible transfer mechanisms are desirable.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A file fetcher manager provides commonly-utilized management and resource allocation for multiple file fetchers that each implement a different type of mechanism or protocol for transferring data files between peer endpoints in meshes associated with a cloud-computing service. Each file fetcher is configured with both client-side and server-side components to retrieve and serve out data files. The file fetcher manager encapsulates the file fetchers to provide an abstract interface to callers while hiding the underlying details of the file fetchers. The file fetcher manager is arranged for managing simultaneous operations of the multiple file fetchers to route requests from the callers to the appropriate file fetchers, and for scheduling work items for the file fetchers so that data transfers efficiently utilize available resources such as network bandwidth and connections. Using multiple fetchers enables file transfers to be performed in a variety of ways. For example, a data file can be transferred in its entirety as an HTTP (Hypertext Transfer Protocol) stream from a single peer or cloud resource or in chunks (in fixed or variable sizes) from multiple peers or resources in parallel.

The file fetcher manager provides an extensible approach to file transfer that can be tailored to meet the needs of a dynamic cloud environment where peer endpoints go on and offline, bandwidth availability changes, etc. A file can be transferred through the combined efforts of multiple file fetchers and work may be transferred among fetchers while the file fetcher manager keeps the entire transfer process coherent and organized.

In an illustrative example, remote differential compression ("RDC") capable file fetchers are implemented that may supplement normal chunking (i.e., non-RDC, naïve) fetchers to optimize away the need to fetch file chunks that are already locally present in an endpoint. In addition, different endpoints in the meshes can run different sets of file fetchers to match the capabilities of the file fetchers to those of the endpoints.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
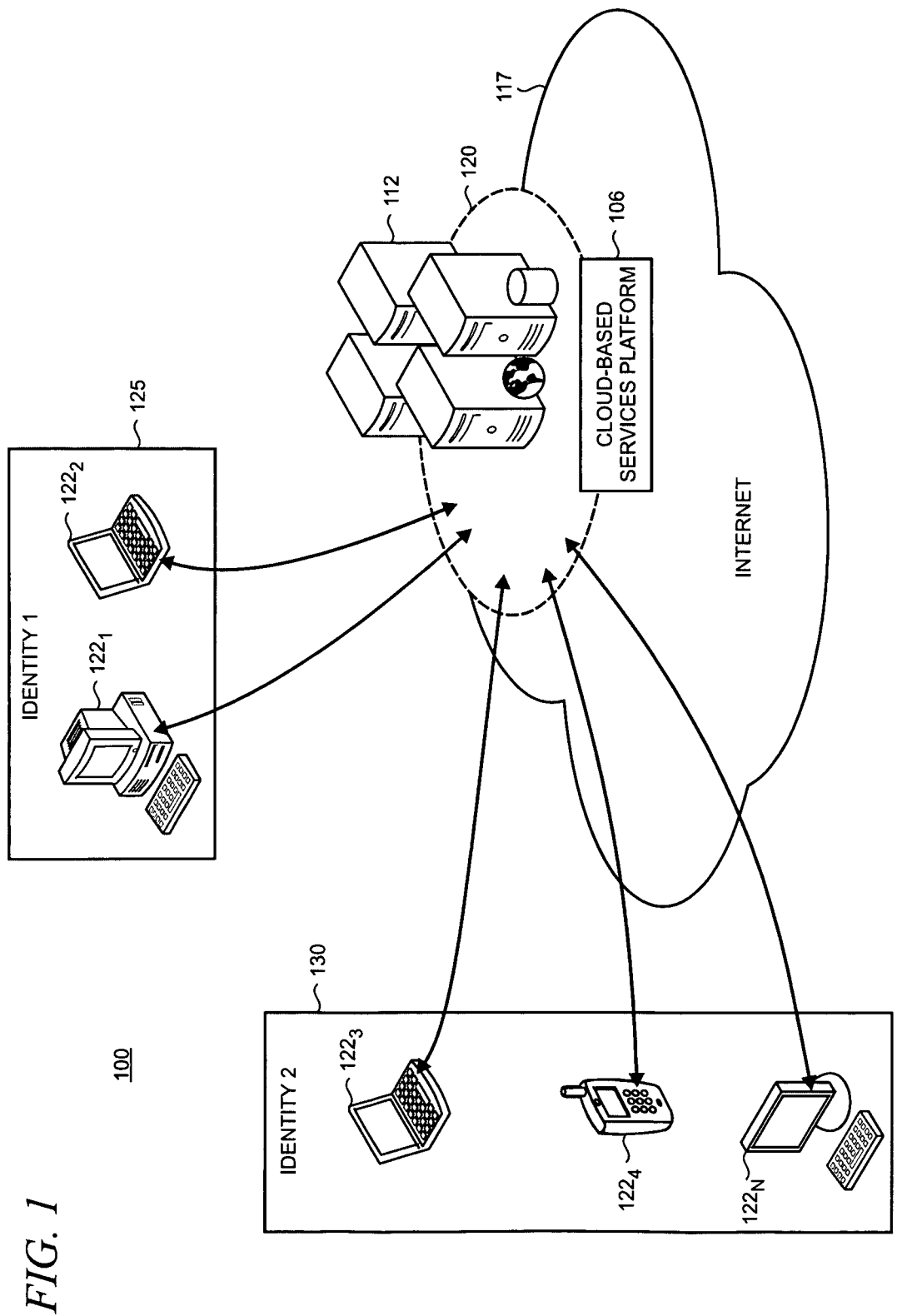
FIG. 1 shows an illustrative cloud-computing environment in which the present file fetcher manager and file fetchers may operate.

FIG. 1 shows an illustrative cloud-computing environment 100 in which the present file fetcher manager and file fetchers may operate. Environment 100 includes a cloud-based services platform 106 that exposes resources 112 to be accessed by client devices and users as services over a network such as the Internet 117. Cloud-computing services (hereinafter referred to as "cloud service(s)") are indicated in the abstract in FIG. 1 by the dashed oval 120. By utilizing typically large scale data centers and associated network infrastructure (which together form the "cloud"), the cloud-based services platform 106 may provide a virtualized computing application layer that supports an implementation of a variety of service offerings under, for example, the "software as services" or "software plus services" models.

Cloud services 120 may replace, supplement, or blend with features and capabilities provided by applications and software that run locally. Offerings may include, for example one or more of identity and directory services, device management and security, synchronized storage and data services across multiple devices or platforms, and services pertaining to activities and news. The cloud services 120 may be provided under a variety of different business models including free, advertising-supported, and subscription-based models.

As shown in FIG. 1, a group comprising N different endpoint devices 122 (referred to simply as "endpoint(s)") is present in the environment 100. In this example, a user has a PC $122_1$ and a portable laptop computer $122_2$ that are arranged to access the service resources 112 exposed by the cloud-based services platform 106 under the user's credentials, or identity (as indicated by reference numeral 125), which is trusted by the cloud services 120. Another user maintains a trusted identity 130 so that that user may couple a laptop computer $122_3$, a mobile device $122_4$, and a PC $122_N$ to the Internet 117 to utilize the cloud services 120.

The endpoints 122 shown in FIG. 1 can typically be expected to have differing features and capabilities which may vary widely in some cases. For example, the PCs $122_1$ and $122_N$ may utilize different operating systems, respectively, including the Microsoft Windows® operating system and the Apple Mac OS® operating system. In addition, the portable device $122_4$ will typically be configured with fewer resources such as processing power, memory, and storage compared to the PCs and laptops and will use a different operating system.

It is emphasized that the endpoints shown in FIG. 1 are merely illustrative and a variety of different endpoint devices may be utilized with the present file fetcher manager and file fetchers. These include for example, media center PCs, game consoles, set-top boxes, ultra-mobile computers, handheld game devices, mobile phones, PDAs (personal digital assistants), pocket PCs, personal media players such as MP3 players (Moving Pictures Expert Group, MPEG-1, audio layer 3), and similar devices.

Figure 2:
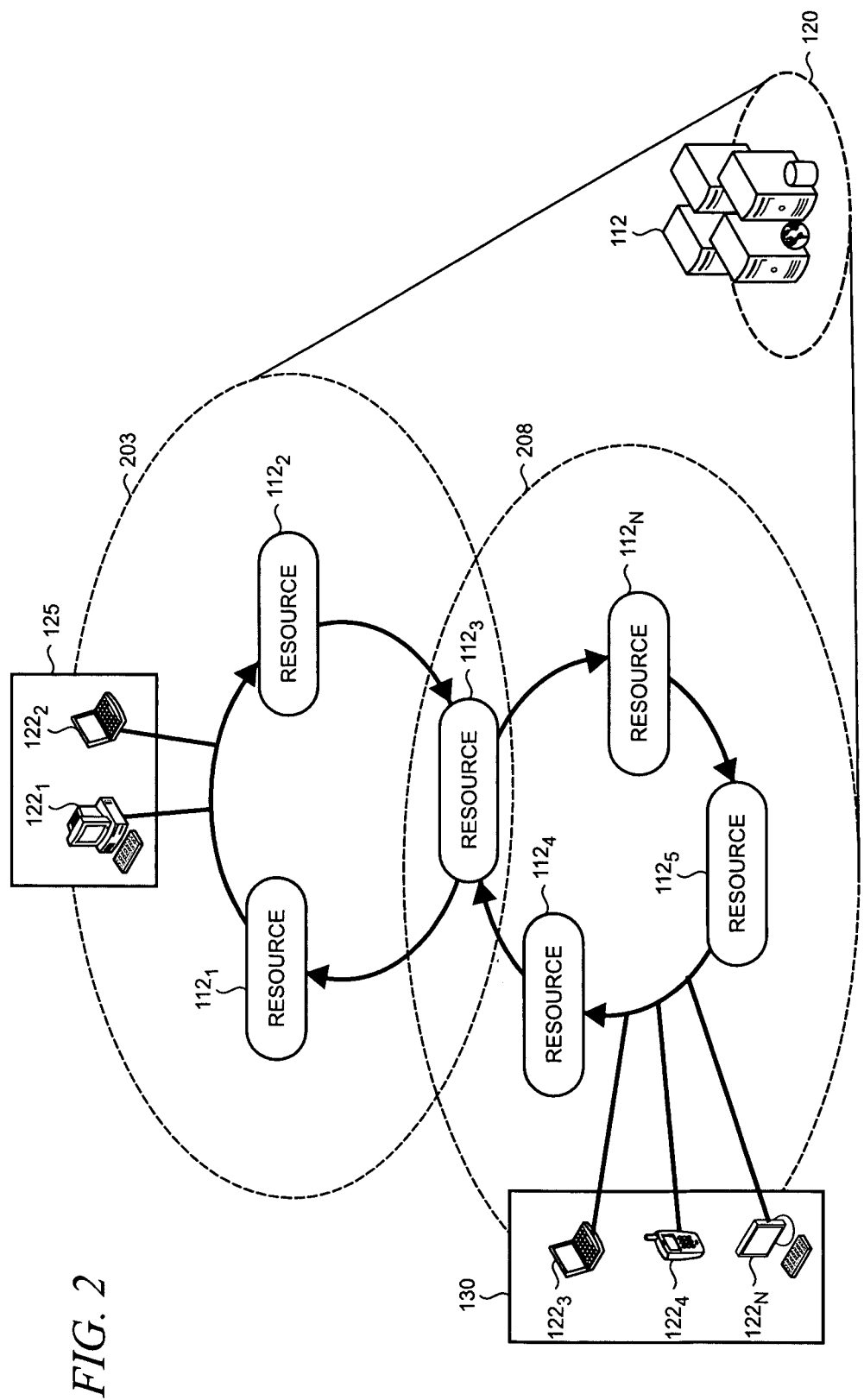
FIG. 2 shows how resources exposed by cloud-based platform services are illustratively arranged with client devices (called endpoints) into meshes.

As shown in FIG. 2, the resources 112 that are exposed by the cloud services 120 may be logically arranged to form meshes. In this example, a mesh is associated with each of the identities 125 and 130 (and the endpoints 122 associated therewith) as respectively indicated by reference numerals 203 and 208. The meshes include those resources which are utilized to implement a given service offering for the user and the endpoints which are associated with and can access the resource. In this example, resources $112_1$, $112_2$ and $112_3$ are associated with the user having identity 125 and the endpoints $122_1$ and $122_2$ in mesh 203. The user having identity 130 receives services that are implemented with mesh 208 which includes resources $112_3$, $112_4$, $112_5$ and $112_N$ that are accessible to the user's devices $122_3$, $122_4$, and $122_N$. As shown, an endpoint 122 can traverse a mesh and move from resource to resource in order to gain access to a desired service 120.

Meshes can overlap as shown in FIG. 2. In this example, resource $112_3$ is commonly utilized in both meshes 203 and 208. Resource $112_3$ could be, for example, a folder on the cloud to which one user as an owner has given the other user permission to access as a member. It is noted that the number and configuration of resources shown here in this example are arbitrary, and the particular resources used in a given mesh to implement a specific service offering for a user can be expected to vary to meet the needs of a particular scenario.

Figure 3:
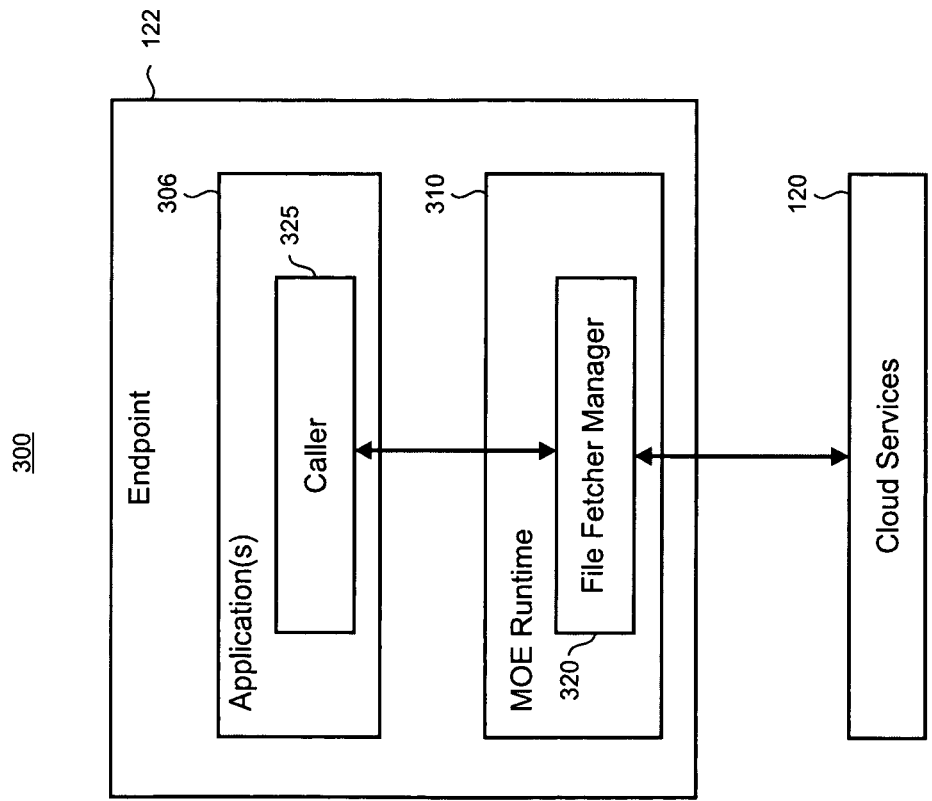
FIG. 3 shows an architecture for an illustrative endpoint that is operatively coupled to cloud services.

An illustrative architecture 300 for a representative endpoint 122 is shown in FIG. 3 which includes several functional components including one or more applications 306, and an instance of a mesh operating environment ("MOE") runtime 310. The MOE runtime 310 is generally configured to expose services to help the applications 306 running on endpoints 122 to create cached or offline-based experiences to reduce round trip interactions with the cloud services 120 or to enable the endpoints to morph data into a more consumable form.

Figure 4:
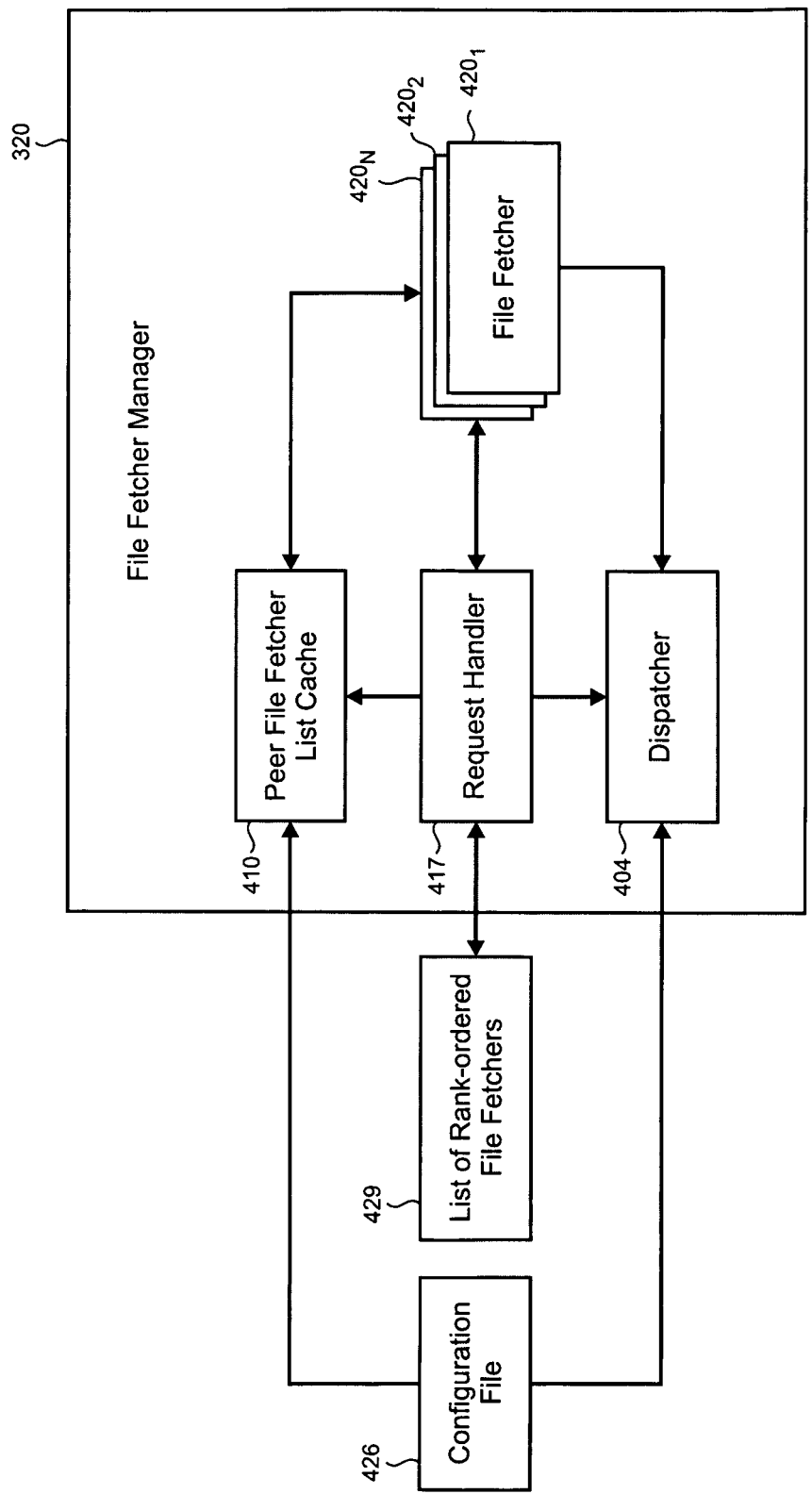
FIG. 4 shows an architecture for an illustrative file fetcher manager.

More specifically, the MOE runtime 310 in this example includes a file fetcher manager 320 that interfaces with a caller 325 in the application 306. As shown in FIG. 4, components in the file fetcher manager 320 include a dispatcher 404, a peer file fetcher list cache 410, a request handler 417, and a multiplicity of file fetchers $420_{1, 2 \ldots N}$. The particular file fetchers 420 used in a given endpoint will typically take the capabilities of the endpoint into account, and not all endpoints necessarily need to utilize the same number and kinds of file fetchers. For example, the mobile device $122_4$ will not ordinarily run an RDC-enabled file fetcher.

The dispatcher 404 is utilized to queue work items associated with incoming requests to serve and retrieve files from the file fetchers 420. The file fetcher manager 320 and the file fetchers 420 use the work items to perform work on threads from a global thread pool. Accordingly, throttling and prioritization are implemented at the dispatcher 404 to ensure that a surge of requests does not impair operation of the MOE runtime 310. Throttling is implemented by requiring the file fetchers 420 to queue their work items with the dispatcher 404 in a centralized work queue. The dispatcher 404 will queue the work item if the number of currently active requests is less than a maximum value. The maximum value may be specified in a configuration file 426 stored on the endpoint 122 which provides policies that are applicable to the endpoint.

The peer file fetcher list cache 410 maintains an in-memory cache of peer endpoints 122 and a list of associated file fetchers which may identify capabilities such as whether RDC capability is supported. Entries in the peer file fetcher list cache 410 will typically be subject to expiration (i.e., time-out) where the time-to-live ("TTL") values will be retrieved from the configuration file 426. The peer file fetcher list cache 410, in this particular example, is not persisted and will be rebuilt between restarts of the MOE runtime 310. However, in other implementations the file fetcher list cache 410 could be persisted through specification of an appropriate TTL value that dictates the length of time that such cache data is considered valid.

The peer file fetcher list cache 410 will be used by the file fetchers 420 in an endpoint 122 to determine file fetcher compatibility of a peer endpoint before establishing communication with it. Upon encountering a time-out or a null entry for an endpoint device, the file fetcher 420 will query that endpoint's file fetcher manager 320 for a current list of file fetchers for the endpoint and then update the peer file fetcher list cache 410 with the query results. Maintaining the peer file fetcher list cache 410 at the file fetcher manager 320 level enables all the file fetchers 420 in the endpoint to share it.

The request handler 417 is responsible for tracking the incoming requests from local callers to download files and the incoming requests from callers at remote peer endpoints to serve files and then routing the requests to the appropriate file fetchers 420. The request handler 417 maintains a list of locally available file fetchers 420 that are sorted in order of preference (i.e., rank-ordered) for handling the requests. When an incoming request is queued, the request handler 417 will route the request to the most preferred file fetcher, or as discussed below, may route the request to enable multiple file fetchers to be utilized simultaneously. Upon successful completion of a request, the request handler 417 passes a pointer to the file to the caller 325 (FIG. 3). The caller is normally expected to move the file, for example, when the file is part of an installation.

If a failure is encountered when a file fetcher 420 is attempting to service a file request, then an error message is passed to the request handler 417. The request handler may choose to retry the request with a different file fetcher 420 depending on the nature of the failure. For example, if the failure occurred because none of the peer endpoints 122 containing the requested file are compatible with the currently-utilized file fetcher, then the next file fetcher in the rank-ordered list 429 may be tried. If no other file fetchers remain in rank-ordered list 429, then another error message can be returned.

If the failure occurred because none of the endpoints 122 containing the requested file are online, then the request cannot be satisfied by the file fetcher manager 320. In this case, the failure is communicated to the caller 325 which will be responsible for retrying the request at another time.

The request handler 417 is also responsible for serving requests from remote endpoints 122 for information about its locally associated file fetchers 420 and their capabilities (e.g., whether or not RDC-enabled).

Figure 5:
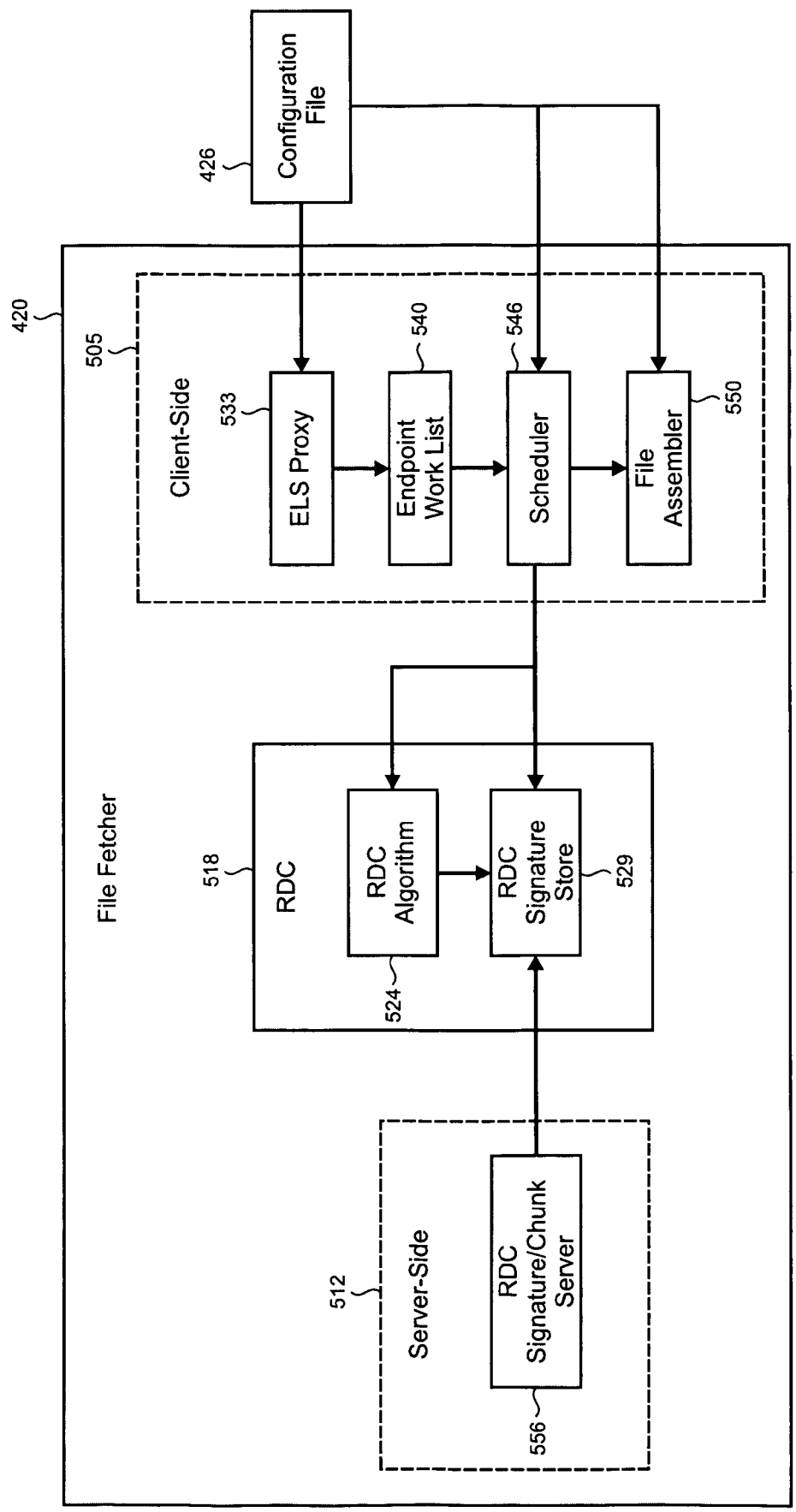
FIG. 5 shows a first set of components used in an illustrative file fetcher for implementing server-side and client-side functionality for serving data files and retrieving data files from other devices.

Details of an illustrative file fetcher 420 are shown in FIG. 5. The file fetcher 420 is configured to support chunked file uploads and downloads. "Chunked" is a type of transfer encoding by which the message body is transmitted to an endpoint as chunks that are stamped with the size of the chunks (see, for example, section 14.40 of RFC 2068 (Requests for Comments from the Internet Engineering Task Force, or "IETF")). In addition, in this example, RDC-capability is built on top of the chunking layer for fetchers that operate on a Microsoft Windows platform. However, it is emphasized that other fetchers with other capabilities may also be utilized using other file transfer protocols including both client-server and peer-to-peer protocols that can utilize a single TCP (transport control protocol) socket or different TCP sockets. For example, one file fetcher 420 may be configured to download a file using HTTP from a storage service on the cloud, while another file fetcher may be configured to download a file in chunks using a peer-to-peer protocol, and another file fetcher is RDC-compatible.

The file fetcher 420 includes both client-side 505 and server-side 512 components so that the file fetcher may both retrieve files and serve up files. In this illustrative example, an RDC component 518 is commonly utilized across the client-side component 505 and server-side component 512. However, it is emphasized that the use of RDC is illustrative, and that other types of file replication and transfer mechanisms may also be utilized as may be required to meet the needs of a particular implementation.

In the RDC component 518, an RDC algorithm component 524 implements a conventional RDC algorithm where the parameters for the algorithm, including, for example, minimum and maximum block size, are retrieved from the configuration file 426 (FIG. 4). An RDC signature store 529 contains the logic used to maintain a store for caching the RDC signatures for a given file. The RDC signatures are stored in a separate file named after the file's URI (Uniform Resource Identifier), under a directory that is picked up from the configuration file 426. Using a naming scheme that relies upon the file URI ensures that out-of-date signatures cannot be erroneously utilized since subsequent versions of the same file will have different URIs. The RDC signature store 529 maintains in-memory state about the signatures, but not the signatures themselves. This in-memory state is rebuilt each time the endpoint 122 (and MOE runtime 310) is started up by implementing a simple directory scan and updating the cache during execution as appropriate.

The caller 325 (FIG. 3) can explicitly delete signatures in the RDC signature store 529 or let cleanup logic implemented by the store flush them away at restart. The cleanup logic is run once at start up and then again after a configurable time period. The cleanup logic will check if any signatures are older than a configurable age, and if so, delete those signatures. Changes to files are subscribed to here as well so that out-of-date signatures may be aggressively cleaned up (as out-of-date signatures have no utility).

In the client-side component 505 which handles requests to retrieve files, an ELS (Enclosure Locator Service) proxy 533 is provided. Typically, the different file fetchers 420 may utilize different ELS implementations. The ELS is typically implemented as a cloud service 120 which can map files to endpoints 122. The file fetcher 420 interacts with the ELS proxy 533 to: obtain a list of endpoints 122 that contain a file; notify the ELS proxy 533 of the local availability of a file; and notify the ELS proxy 533 of the local removal of a file. The ELS proxy 533 not only contains the asynchronous call stubs for these operations, but is also the first point of entry for file requests entering the file fetcher 420. That is, when the request first comes in, it is queued for ELS lookup in the ELS proxy 533. The queue is arranged in this example as a priority queue with dual priority levels—normal and high. The priority level for the request is typically specified by the caller 325.

Lookups to the queue are performed by de-queuing file requests from the queue on a priority basis with ties in priority being broken randomly. If a lookup is successful, the results are passed to an endpoint work list 540 so that the file may be queued for download. If the lookup failed (which would occur if no peer endpoint has the requested file), then an error is generated and delivered to the caller 325. The ELS proxy 533 is also configured for batching communications to the ELS to enable better scalability in the cloud, where parameters for the batching are provided by the configuration file 426.

Every endpoint 122 with pending work has an associated work list which is maintained by the endpoint work list 540. The work list 540 supports dual-level priorities—normal and high—where the priority for each item in the work list is specified by the caller 325. A best-effort will normally be made to honor the specified priority.

Requests to the work list 540 are queued after a successful ELS lookup for a file. The incoming requests contain details regarding the file to be fetched including a list of endpoints 122 on which the file can be found. This list is inverted and the request is added to the work list that is associated with each endpoint 122 from which the file can be retrieved. When the scheduler 546 (which implements file retrieval according to policies as described below in more detail) is ready for more work, it uses the endpoint work list 540 to obtain more. The scheduler 546 may either allow the endpoint work list 540 to randomly pick an endpoint 122 and choose a request on that endpoint's work list with the highest priority (where ties are broken randomly), or it may specify an endpoint from the which the endpoint work list 540 will choose a request to de-queue.

If the file returned is present on the work lists of other endpoints 122₁ it is not removed from them. This behavior implies that the scheduler 546 could pick up the request for the same file for the work lists of different endpoints 122 at different times. This simply results in the file being downloaded in parallel from the multiple chosen endpoints. Chunks will not be downloaded redundantly as ensured by the file assembler 550 (as described below in more detail).

The file assembler 550 is implemented in this example as a thin layer on top of the file system API (application programming interface) that assists in reconstructing a file from a stream of bytes. The file assembler 550 stores files in a directory that is specified by the configuration file 426. The file assembler 550 maintains two different kinds of files—files that have been completely downloaded (.final file extension), and files that are still being downloaded (.partial file extension). In-memory state for both file types is maintained and is rebuilt each time the endpoint 122 (and MOE runtime 310) is started up. The in-memory state is updated during execution as appropriate.

When generating the state for a new file, the file assembler 550 requires the caller 325 to specify the number of chunks and the size of each. The file assembler 550 allocates space of the required size beforehand for the entire file to ensure less fragmentation. The file is named after the URI of the file with the .partial file extension. At the end of the file, a bitmap is appended to indicate which chunks have been fetched and written to the file. This bitmap is also maintained in an in-memory cache. It is noted that the file assembler 550 does not make any assumptions regarding the sizes of the chunks. Accordingly, RDC or a fixed-size chunking protocol may be employed on top of the same file assembler.

Before retrieving a file chunk, the scheduler 546 uses the in-memory bitmap to lock the chunk to avoid duplicate requests for the same chunk. After the last chunk is written to the file, the file assembler 550 removes the bitmap that was appended to the file, and renames the file to have the final file extension. The caller 325 can then make use of the fetched data.

The file assembler 550 is configured with logic to garbage-collect unused files that have been left in a partially assembled state or which appear to have been forgotten by the caller. The files are cleaned up after installation. In addition cleanup logic runs at startup, and once every configurable period of time, that will delete files that are older than a configurable age.

The bitmap and the dual extensions (i.e., .final file extension and .partial file extension) enable recovery to be very straightforward in cases where the MOE runtime 310 crashes or in case of an abrupt shutdown when the file is in the process of being downloaded. The dual file extensions cleanly separate files that have been downloaded from those that are still being downloaded (and which thus have a bitmap appended). The bitmap can be used to indicate how much of the file has been retrieved.

The scheduler 546 is fundamental to the file retrieval process. It picks up work from the endpoint work list 540 in the form of <endpointid, fileUri> tuples, where <endpointid, fileUri> is a work item to retrieve the file specified by fileUri from endpointid. In the case of a sudden surge of requests, if the scheduler 546 starts working at all the requests concurrently, very little progress will be made on each request, and overall system performance will degrade. To avoid such a scenario, the number of concurrent work items is restricted to a maximum specified in the configuration file 426.

When the number of active work items falls below the maximum, more work is obtained from the endpoint work list 540, if available. It is noted that there could be multiple work items active for a given file, but with different endpoints 122. This implies that the file chunks will be retrieved in parallel from all of such endpoints 122.

When a work item is obtained, the file fetcher 420 checks to see if the remote endpoint 122 contains the same file fetcher. This is accomplished by checking the peer file fetcher list cache 410 (FIG. 4) in the file fetcher manager 320 for valid entry for the given endpoint 122. If no valid entries are found, then the remote file fetcher manager is queried for file fetcher information. This information is added to the cache and is used to determine the remote presence of the same file fetcher. The work item is removed if an incompatibility is detected. If the work item to be removed is the last work item for the file in an endpoint work list, then an error is returned to the caller 325.

In this example, the entire file transfer process (irrespective of whether RDC capability is provided or not) is based on chunking. A list of chunks to be fetched for each file is maintained by the file assembler 550. Before downloading chunks from a remote endpoint 122₁ a list of available chunks on the remote endpoint is fetched. This list is used to query for new file chunks. As chunks flow in, they are written to the file assembler 550 and new file chunk requests are made. Before making a request for a chunk, the chunk is locked to the file assembler 550 to avoid duplicate requests for the chunk. One benefit of RDC in this chunking-driven downloading is optimization away from the need for fetching locally present identical chunks that would normally be implemented by a naïve chunking-based fetch.

The scheduler 546 is configured to first check to see if the file assembler 550 already contains an entry for the file. If an entry does not exist, one is created and initialized. An entry could exist in the file assembler 550 if another work item for the same file is being serviced by the scheduler 546, or if the download was interrupted for some other reason during previous attempts. These reasons could include, for example, an MOE runtime crash or abrupt shutdown. If a previous in-memory state exists, then the only work left to be performed is to fetch the remaining chunks and complete the download, irrespective of whether RDC is used or not.

If no previous in-memory state for the file exists in the file assembler 550, then the local endpoint 122 negotiates the mode of file transfer (e.g., RDC versus naïve chunking) depending upon a variety of factors including the size of the file, and the availability of RDC capability on both endpoints. RDC overhead, which may include for example computing signatures and accessing the file system multiple times, is typically not justified for small files because the bandwidth savings in such cases is minor.

When RDC is selected for the work item, then the RDC signatures are requested from the remote endpoint 122 and are written to the local RDC signature store 529. The signature store 529 is checked for RDC signatures for locally present previous versions of the same file. If such RDC signatures are not present, they are then generated. Using the generated signatures, the locally available chunks of the target file are written to the file assembler 550. If RDC was not selected, then a naïve chunking-driven download is utilized. If multiple work items are de-queued for a given target file and one of the work items is for performing the RDC steps of retrieving and comparing signatures, then subsequent work items will wait before they start fetching chunks.

Once a file download is completed, all the work items associated with the file both in the endpoint work list 540 and scheduler 546 are removed and a pointer to the file in a store of the file assembler 550 is passed out to the caller 325. If an error was encountered, for example no endpoint has a compatible fetcher or stores the target file, an error code is returned to the caller 325. As noted above, the ELS proxy 533 is used to notify the ELS about the local presence of the file.

An RDC signature/chunk server 556 is the only component that is specific to the server-side 512 of the file fetcher 420 and is responsible for handling requests from the remote endpoints 122 to serve files that are stored on the local endpoint. Upon receipt of an incoming request for a chunk, the requesting endpoint 122 is subjected to authorization to the core object (e.g., a resource 112 in FIG. 1) from which data is requested. If the authorization is successful, a check is made to verify that the request can be satisfied by the file assembler 550. If so, then the data is served out. Otherwise the core object manager (e.g., a handler for a resource 112) is called to obtain a reader to the item for serving out the bytes from the file. The reader is typically required to detect any changes to the item while reading it.

Upon an incoming request for RDC signatures, the RDC signature/chunk server 556 checks the signature store 529 for the RDC required signatures. If the signature store 529 does not have them, they are generated and checked into the store 529 and served out.

Figure 6:
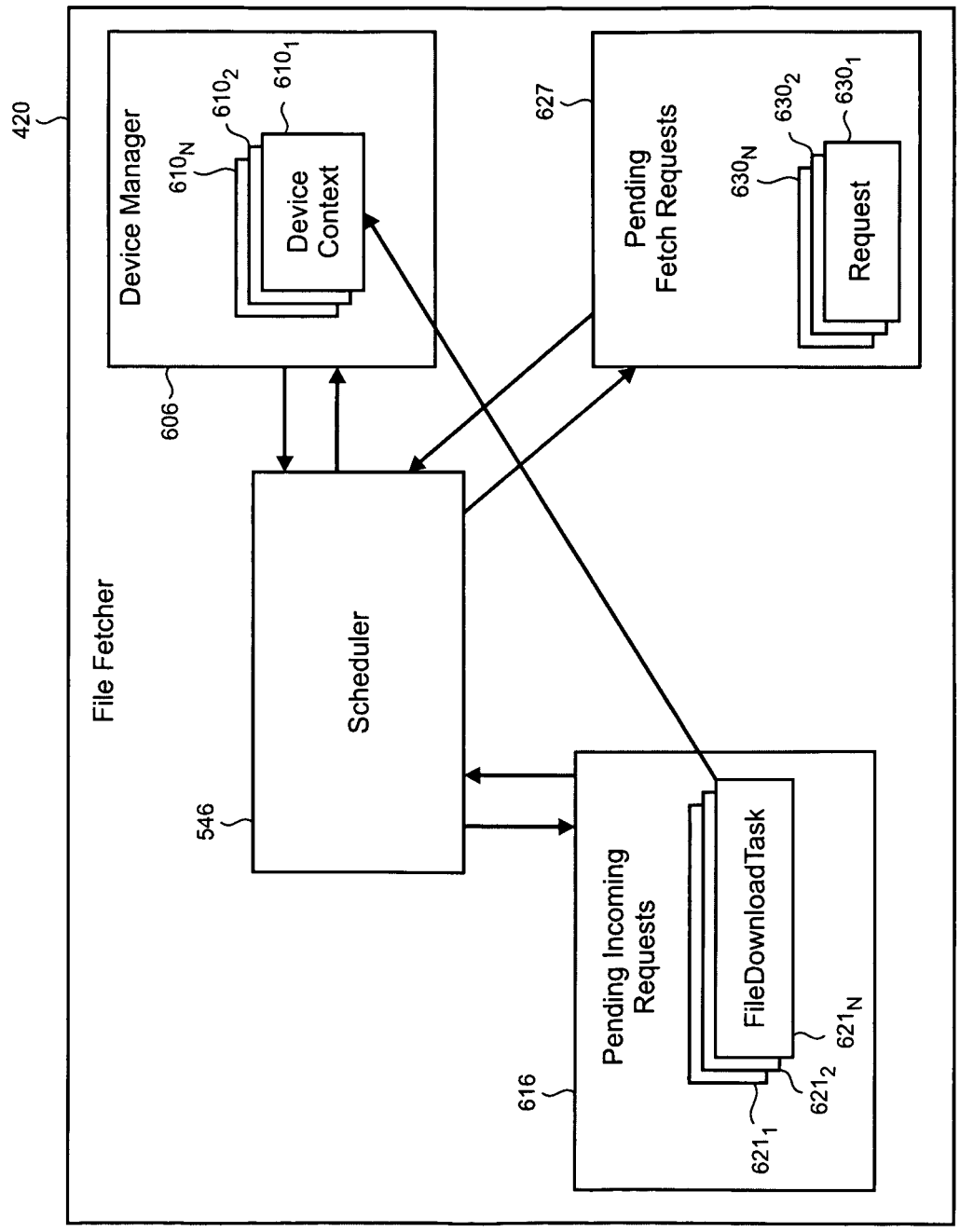
FIG. 6 shows a second set of components used in an illustrative file fetcher for scheduling work.

Work is scheduled in the file fetcher 420 by the scheduler 546 using an additional set of components as shown in FIG. 6 (components not related to scheduling are not shown) that are arranged with an objective of accommodating a variety of scheduling policies. In addition, work for the client-side component 505 and server-side component 512 (FIG. 5) of the file fetcher 420 is scheduled and implemented with the following objectives:

File fetcher client-side objectives:
1. Limit the number of open outgoing connections;
2. Limit outgoing connection establishment rate;
3. Choose endpoints from which to download based on history;
4. Strike appropriate balance to keep connections busy without being overloaded;
5. Adapt to changing network conditions;
6. Honor priority on a best-effort basis.

File fetcher server-side objectives:
1. Limit the number of open incoming connections;
2. Limit incoming connection establishment rate;
3. Limit active requests-per-connection;
4. Prevent overly-active endpoints from causing limitations on service (i.e., starving) other endpoints.

The device manager 606 maintains a multiplicity of device contexts $610_{1, 2 \ldots N}$ where a device context maintains state associated with an endpoint 122. State is maintained on a per-device basis and includes: i) incoming and outgoing channels to the endpoint, ii) online/offline status (i.e., whether the endpoint 122 is online or offline), and iii) request serving history. The request serving history can include, for example, quality of service data pertaining to the latency to serve a request, success rate, available bandwidth, and the like. The state information will typically be used by the scheduler 546 when deciding the endpoints 122 from which to download a file. The device context 610 may or may not include an active communication channel, and terminating a channel will not eliminate an associated device context.

The device manager 606 communicates with the scheduler 546 when an endpoint 122 comes online or goes offline, when an endpoint attempts to establish a connection to make requests to a local file fetcher 420, and when responses to local and remote requests have been made. The scheduler 546 may potentially make endpoint selections at the times such events occur.

The pending incoming requests component 616 maintains pending requests (shown as a plurality of FileDownload tasks $621_{1, 2 \ldots N}$) from remote endpoints 122 that still need to be served. Whenever new requests have been queued, the pending incoming requests component 616 calls the scheduler 546.

The pending fetch requests component 627 tracks pending fetch requests (indicated by reference numerals $630_{1, 2 \ldots N}$) for files located on remote endpoints 122. It will also call the scheduler 546 whenever a new request for a file has been queued or when a file download is completed or cancelled.

Not all fetch requests 630 need to be immediately serviced. The scheduler 546 will decide which fetch requests 630 will be actively serviced. Accordingly, each fetch request 630 will have an associated FileDownloadTask at the remote endpoint 122. The FileDownloadTask has the device context 610 and logic that is necessary to drive the fetch process at the remote endpoint including performing an ELS lookup, download metadata and file chunks, etc. Each FileDownloadTask will typically wait at various states until the scheduler 546 allows it to proceed.

The scheduler 546 decides how to schedule work in accordance with client-side and server-side scheduling policies. Events from other scheduling components in the file fetcher 420 will trigger the scheduler 546 to run the policies to pick up more work and/or assign resources to active work.

Figure 7:
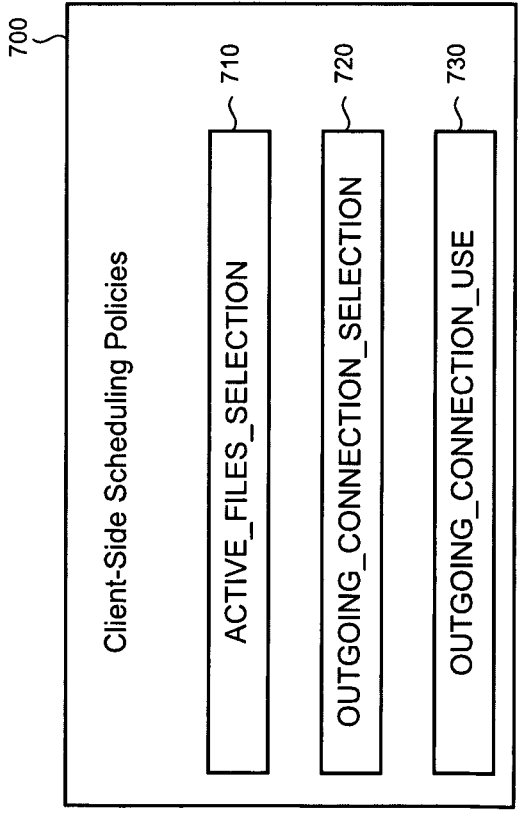
FIGS. 7 and 8 show respective client-side and server-side policies that are used for scheduling work in a file fetcher.

A set of illustrative client-side scheduling policies 700 is shown in FIG. 7.

The ACTIVE_FILES_SELECTION policy (indicated by reference numeral 710) is applied to pick the set of active requests from the list of all pending requests. The policy is configured with the authority, for example, to convert pending requests to active requests and drop active requests back to the list of pending requests.

In an illustrative implementation, the ACTIVE_FILES_SELECTION policy picks high priority files over low priority files, and breaks ties in priority by picking files that have the least amount of work remaining. This approach may be expected to decrease mean download time while not significantly starving large requests.

The policy may implement the following method each time a file request is added, completed, or cancelled.
  Let MIN_NUMBER_OF_ACTIVE_FILES be the minimum of active files.
  Let MAX_ALLOWED_ACTIVE_FILES_SIZE be the maximum allowed summation of size across active files.
  i) While the number of active files is less than MIN_NUMBER_OF_ACTIVE_FILES or summation of size across active files is less than MAX_ALLOWED_ACTIVE_FILES_SIZE
    a. If there are no pending file requests, then return as there is no work to pick up.
    b. Pick up the next pending file request in view of its priority. Break ties by picking the smallest file size. Activate the chosen request. Repeat the method.

The OUTGOING_CONNECTION_SELECTION policy (indicated by reference numeral 720) is arranged to decide the set of endpoints 122 to which connections are opened. The policy decides which new connections to establish and which existing connections should be terminated.

In an illustrative implementation, an endpoint's state including history and current usage from the device context 610 is utilized for decision making. The policy may implement the following method which is applied every time an endpoint 122 comes online, goes offline, and periodically in the absence of these two events to re-evaluate the set of active endpoints in the environment.

Let MIN_CONNECTION_AGE be the minimum age of a connection before it is considered for termination.

Let MIN_BIT_RATE be the minimum bit rate of a connection before it is considered for termination.

Let MAX_CONNECTION_RATE be the maximum allowed rate at which connections are established.

Let MAX_NUMBER_OF_OUTGOING_CONNECTIONS be the allowed maximum number of outgoing connections that can be kept open.

i) If no endpoints are available to which a connection may be made, then return.

ii) Order the list of endpoints that are available but where no connection is made using the history. If no history is available, or there is a tie, then decide randomly.

iii) For each endpoint in the ordered list, perform the following:
  a. If MAX_CONNECTION_RATE has been reached, then wait until the rate decreases.
  b. If the MAX_NUMBER_OF_OUTGOING_CONNECTIONS has not been reached, then connect to the endpoint and repeat the method with the next endpoint.
  c. Search the list of active connections for a connection that is older than MIN_CONNECTION_AGE and has a bit rate less than MIN_BIT_RATE and has the least bit rate across all the active connections. If such a connection is found, then terminate that connection in favor of a new connection. Repeat the method with the next endpoint. If no such connection is found, then return.

The OUTGOING_CONNECTION_USE policy (indicated by reference numeral 730) decides how requests are queued on an open connection. The policy controls how many requests may be outstanding on a connection and which files may be requested on a connection.

In an illustrative example, the policy will attempt to achieve a configurable maximum bit rate. It will queue requests until the maximum bit rate is reached or the remote endpoint returns a busy error code. The ramping up to the maximum bit rate will normally need to be performed with some care to avoid flooding the connection with a burst of requests in an attempt to fill the connection pipe quickly.

Figure 8:
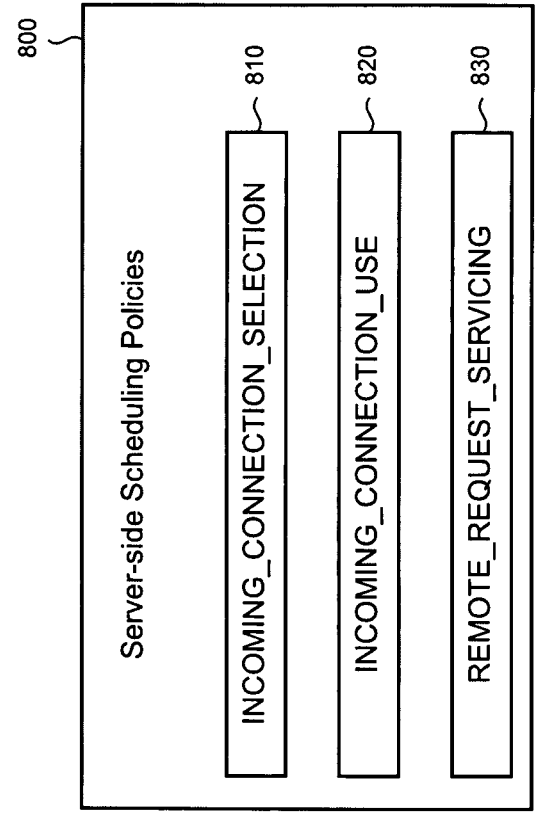

A set of illustrative server-side scheduling policies 800 is shown in FIG. 8.

The INCOMING_CONNECTION_SELECTION policy (indicated by reference numeral 810) selects the set of active incoming connections. The policy determines which peer endpoints 122 can make requests to a local file fetcher 420.

The following method for a new incoming connection may be implemented in an illustrative example.

Let the MAX_NUMBER_OF_INCOMING_CONNECTIONS be the maximum number of incoming connections allowed.

Let the MIN_CONNECTION_AGE be the minimum age of a connection before it is considered for termination.

Let MAX_CONNECTION_RATE be the maximum allowed rate at which connections are established.

i) If the MAX_CONNECTION_RATE has been reached, instruct the peer endpoint to retry later and return.

ii) If the MAX_NUMBER_OF_INCOMING_CONNECTIONS has not been reached, then accept the incoming connection and return.

iii) Pick an active incoming connection that is older than MIN_CONNECTION_AGE. If such a connection is found, terminate it in favor of the new incoming connection; else instruct the peer endpoint to retry later.

The INCOMING_CONNECTION_USE policy (indicated by reference numeral 820) determines the allowable usage of an incoming connection. The policy ensures that a remote peer endpoint 122 does not flood the local file fetcher 420 with requests. Any request allowed by this policy is queued for servicing.

In an illustrative example, the policy accepts new requests on an incoming connection as long as the number of requests already made from the connection does not exceed a configurable maximum, and the bit rate on the connection has not reached the maximum configurable allowed bit rate. Once a request is accepted it is queued. If the request is not accepted, a busy status message is communicated to the peer endpoint 122.

The REMOTE_REQUEST_SERVICING policy (indicated by reference numeral 830) determines how queued requests get de-queued and serviced. The policy ensures local activity at the endpoint 122 is not affected by the servicing of remote requests. In an illustrative implementation, the total number of requests being actively serviced will be limited to a configurable maximum.

Several sample data flows are now presented to illustrate the principles of the present arrangement for managing date transfer.

Figure 9:
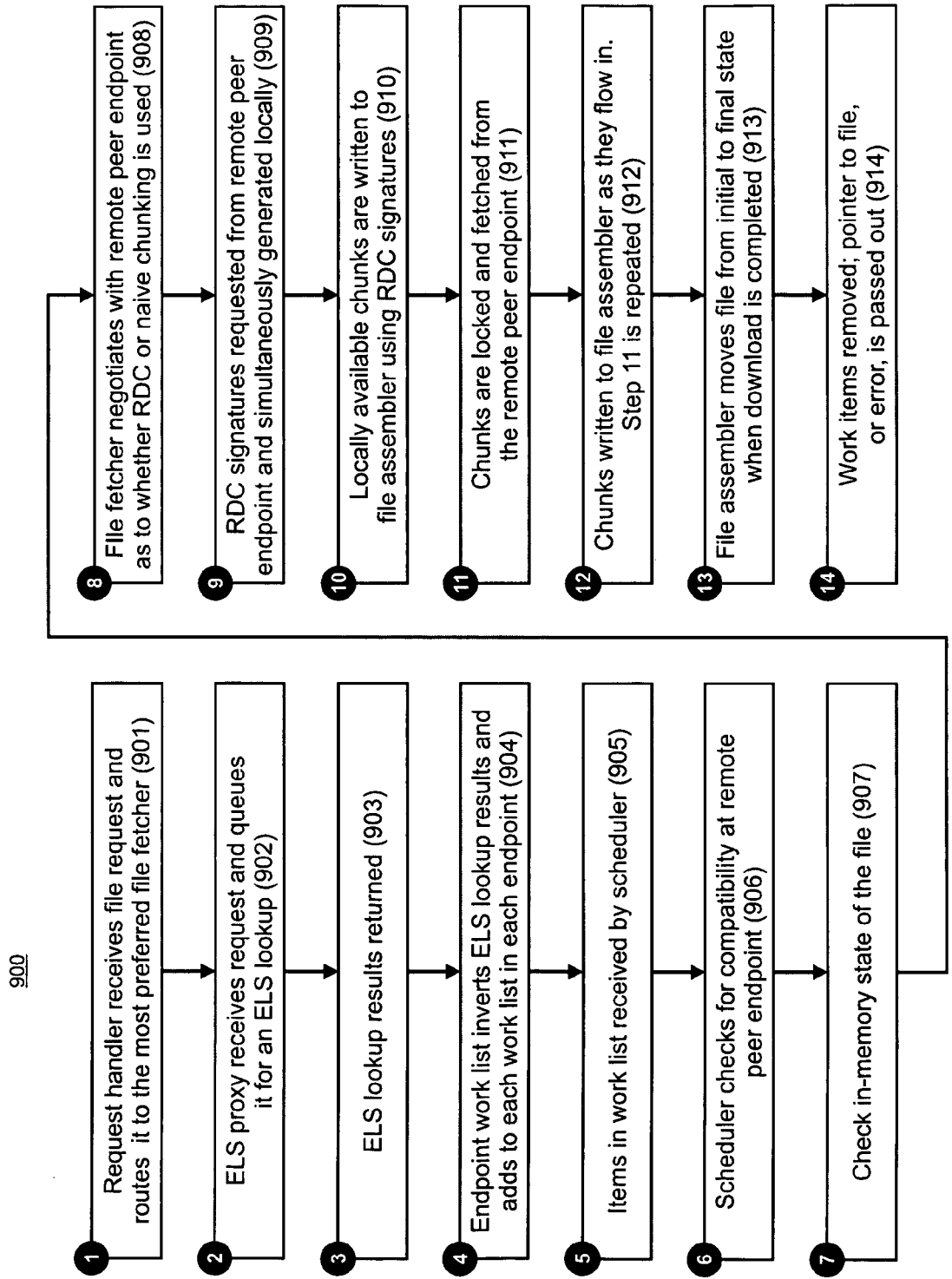
FIG. 9 is an illustrative data flow diagram that shows the handling of a request for a file from a local caller.

FIG. 9 is an illustrative data flow diagram 900 that shows the handling of a request from a local caller 325 to retrieve a file from a remote peer endpoint 122. The request handler 417 receives the request from the caller 325 and routes it to the most preferred file fetcher 420 (901). The queue in the ELS proxy 533 receives the request and queues it for an ELS lookup to determine which peer endpoints contain the requested file (902).

Results of the ELS lookup are returned to the ELS proxy server (903). If an error is encountered during the lookup, or if the file is not found on any of the endpoints 122, then an error is returned. If no error is encountered, then the lookup results are sent to the endpoint work list 540.

The endpoint work list 540 inverts the list of ELS lookup results and adds it to the work list of each endpoint 122 (904). The work item(s) for the requested file will eventually be received by the scheduler 546 (905). The scheduler 546 checks to see if the file fetcher at the remote peer endpoint is compatible with the local file fetcher (906). If it is not, the work item is removed. If it represents the last work item for a file, then an error is returned, else the method goes back to step 5 and waits for another work item for the file to be de-queued.

The file assembler 550 checks for the previous in-memory state for the file (907). If not found, a new state is created and initialized. If a previous state is found, then the method goes to step 11. The file fetcher 420 negotiates which type of download—in this example either RDC or naïve chunking—should be used for the file transfer (908). For RDC, the RDC signatures for the file are requested from the remote peer endpoints 122. In addition, the RDC signatures for locally present previous versions of the file are generated if they are not already part of the RDC signature store 529 (909).

Based on the RDC signatures, the locally available chunks are written to the file assembler 550 for the file (910). Chunks are locked to avoid duplicate requests and are fetched from the remote peer endpoint 122 (911). As the chunks flow in, they are written to the file assembler 550 and the method step 11 is repeated (912). When a file download completes, the file assembler 550 moves the file from the partial state (i.e., .partial file extension) to the final state (i.e., .final file extension) (913).

If the request is successful, then a pointer to the file is passed out to the caller 325. Otherwise, if an error is encountered, for example no endpoint has a compatible fetcher or stores the target file, an error code is returned to the caller 325 (914).

Figure 10:
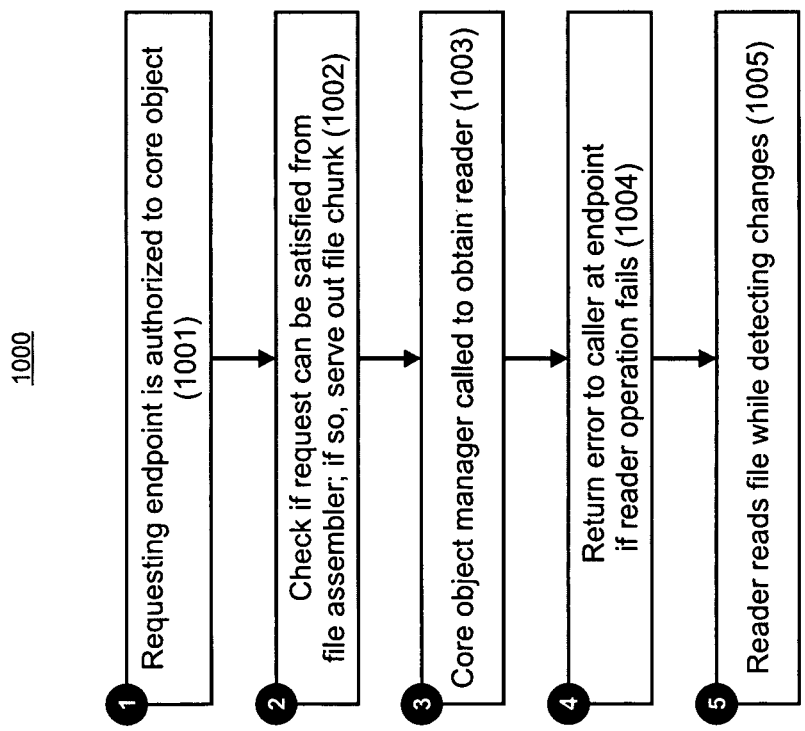
FIG. 10 is an illustrative data flow diagram that shows the handling of a request for a file chunk from a remote endpoint.

FIG. 10 is an illustrative data flow diagram 1000 that shows the handling of a request for a file chunk from a remote peer endpoint 122. At the RDC signature/chunk server 556, the requesting endpoint 122 is authorized to the core object from which the file will be served out (1001).

The file assembler 550 is checked to determine if the incoming request can be satisfied from the file assembler. If so, then the file chunk is served out and the method ends (1002). If not, the core object manager (e.g., a handler for a resource 112) is called to obtain a reader (1003). An error is returned to the caller 325 at the endpoint 122 if the call fails (1004). Otherwise the reader is used to serve out the appropriate bytes (1005). The reader will normally be expected to detect any changes while reading an item.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing a file fetcher arranged for serving and retrieving files to and from endpoints on a network supporting peer-to-peer file transfer, the method comprising the steps of:
    associating work items in a work list with pending file requests from a caller at an endpoint, the work list being arranged to support prioritization of the work items;
    obtaining a list of endpoints that contain at least a portion of files associated with the pending file requests;
    maintaining a state for a file, the state identifying the file as being partially or completely downloaded;
    retrieving at least a portion of a file in accordance with the work list, the list of endpoints, and the file state; and
    serving at least a portion of a file responsively to a request from a caller at a remote endpoint,
    wherein said retrieving step further comprises downloading the file using chunked file fetching and includes the further steps of:
    receiving a list of available file chunks at an endpoint, and
    receiving, from the caller, a number of file chunks and associated size of each chunk for creating the file state for a file, wherein space of a required size is allocated, at the file fetcher, prior to retrieving the file, based upon said number of file chunks and associated size of each chunk received from the caller, and
    wherein the work list contains a plurality of work items for a file so that the file is retrieved in chunks in parallel from a plurality of endpoints;
    in which a bitmap is appended at the end of the file and is maintained in an in-memory cache; and
    wherein the bitmap appended to the file is removed after a last chunk is written to the file.

2. The method of claim 1 including a further step of authorizing the remote endpoint to a core object from which the file portion will be served out to the remote caller.

3. The method of claim 1 in which the list of endpoints is provided by an enclosure locator service.

4. The method of claim 1 including the further steps of locking a chunk to prevent duplicate requests from the caller, and requesting additional file chunks.

5. The method of claim 4 including a further step of implementing RDC-based chunked file fetching.

6. The method of claim 1 including a further step of implementing an interface between the file fetcher and a file fetcher manager that is commonly utilized by a plurality of file fetchers that operate at each respective endpoint, the file fetcher manager routing requests among ones of the plurality of file fetchers.

7. A method performed by a local file fetcher manager for managing a plurality of local file fetchers, the method comprising the steps of:
    exposing file retrieval and server functionality provided by the file fetchers to callers comprising a local caller at a local endpoint and to a remote caller at a remote peer endpoint, the local endpoint and the remote peer endpoint being coupled to a cloud service supporting peer-to-peer file sharing;
    querying one or more remote file fetcher managers to determine capabilities of remote file fetchers at respective remote peer endpoints, wherein the capabilities indicate whether each queried remote file fetcher is RDC-enabled;
    maintaining a list indicating the RDC-enabled capabilities of each remote file fetcher in a cache; and
    routing requests from the callers to a file fetcher selected among the plurality of local file fetchers according to the capabilities,
    wherein a file is retrieved in chunks in parallel from a plurality of endpoints, and
    wherein a bitmap is appended at the end of the file and is maintained in an in-memory cache; and
    wherein the bitmap appended to the file is removed after a last chunk is written to the file.

8. The method of claim 7 including a further step of transferring work for retrieving a file among the local file fetchers.

9. The method of claim 7 including a further step of scheduling work items associated with the plurality of file fetchers with a global thread pool.

10. The method of claim 7 including the further steps of rank-ordering the local file fetchers by preference and routing file fetch requests by preference.

11. The method of claim 7 including a further step of passing a pointer to a retrieved file to the local caller.

* * * * *